(12) United States Patent
Du et al.

(10) Patent No.: US 12,083,994 B2
(45) Date of Patent: Sep. 10, 2024

(54) STEP MOUNTING MECHANISM AND MOTORIZED DEVICE

(71) Applicant: T-MAX (HANGZHOU) TECHNOLOGY CO., LTD., Zhejiang (CN)

(72) Inventors: Xinfa Du, Zhejiang (CN); Qi Zhang, Zhejiang (CN); Linjie Xu, Zhejiang (CN); Songfeng Wang, Zhejiang (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 382 days.

(21) Appl. No.: 17/517,138

(22) Filed: Nov. 2, 2021

(65) Prior Publication Data

US 2023/0088553 A1    Mar. 23, 2023

(30) Foreign Application Priority Data

Sep. 17, 2021  (CN) .......................... 202111094406.7
Sep. 17, 2021  (CN) .......................... 202122264778.1

(51) Int. Cl.
*B60R 3/02* (2006.01)
*F16J 15/3268* (2016.01)

(52) U.S. Cl.
CPC ............. *B60R 3/02* (2013.01); *F16J 15/3268* (2013.01)

(58) Field of Classification Search
CPC ....... B60R 3/02; F16J 15/3268; F16J 15/3204
See application file for complete search history.

(56) References Cited

U.S. PATENT DOCUMENTS

| 6,149,172 A * | 11/2000 | Pascoe ..................... B60R 3/02 280/169 |
| 8,136,826 B2 * | 3/2012 | Watson .................... B60R 3/02 280/166 |

(Continued)

FOREIGN PATENT DOCUMENTS

| CN | 202400018 U | 8/2012 |
| CN | 203372142 U | 1/2014 |

(Continued)

OTHER PUBLICATIONS

International Search Report dated Apr. 20, 2022 for corresponding Chinese International Application No. PCT/CN2021/119092, filed Sep. 17, 2021.

(Continued)

*Primary Examiner* — Steve Clemmons
(74) *Attorney, Agent, or Firm* — David D. Brush; Westman, Champlin & Koehler, P.A.

(57) ABSTRACT

A step mounting mechanism includes a mounting seat, a drive component, a first connecting rod, a second connecting rod and a step mounting member. The mounting seat is provided with first and second shaft holes. The drive component is connected to a drive shaft. Two ends of the first connecting rod are provided with third and fourth shaft holes. A first sealing shaft sleeve is fitted over the drive shaft, and is at least partially located in the first shaft hole. Two ends of the second connecting rod are provided with fifth and sixth shaft holes, and the second and fifth shaft holes are hinged through a first hinge shaft. The step mounting member is provided with seventh and eighth shaft holes, the fourth and seventh shaft holes are hinged through a second hinge shaft, and the sixth and eighth shaft holes are hinged through a third hinge shaft.

12 Claims, 6 Drawing Sheets

(56) References Cited

U.S. PATENT DOCUMENTS

| | | | |
|---|---|---|---|
| 9,656,609 B2* | 5/2017 | Du | .................. F16H 19/001 |
| 10,618,472 B2* | 4/2020 | Du | ..................... B60R 3/02 |
| 10,649,483 B2* | 5/2020 | Liu | .................. G05G 1/40 |
| 10,682,960 B2* | 6/2020 | Du | ..................... B60R 3/002 |
| 11,198,394 B2* | 12/2021 | Du | ..................... B60R 3/02 |
| 2007/0176389 A1 | 8/2007 | VanBelle et al. | |
| 2019/0294196 A1 | 9/2019 | Liu et al. | |
| 2020/0369209 A1* | 11/2020 | Pantea | ............... B62D 35/02 |

FOREIGN PATENT DOCUMENTS

| | | | | |
|---|---|---|---|---|
| CN | 106627383 A | | 5/2017 | |
| CN | 206358076 U | | 7/2017 | |
| CN | 108248515 A | | 7/2018 | |
| CN | 108973868 A | * | 12/2018 | |
| CN | 111271463 A | * | 6/2020 | ........... F16J 15/3232 |
| CN | 211731222 U | * | 10/2020 | |
| CN | 212125000 U | * | 12/2020 | ............... B60R 3/02 |

OTHER PUBLICATIONS

Chinese Office Action dated Jul. 22, 2023, for corresponding Chinese Application No. 202111094406.7.

\* cited by examiner

STEP MOUNTING MECHANISM AND MOTORIZED DEVICE

CROSS-REFERENCE TO RELATED APPLICATIONS

This application is based on and claims priority to the Chinese Patent Application Nos. 202111094406.7 and 202122264778.1 filed on Sep. 17, 2021, the entire contents of which are incorporated herein by reference.

FIELD

The present disclosure relates to a field of mechanical sealing, and more particularly, to a step mounting mechanism and a motorized device.

BACKGROUND

In the related art, sediment and dust tend to accumulate between a shaft and a shaft sleeve in a mechanism of the step after the step is used for a period of time. In this case, noise will be generated during operation of the step, thus affecting the step-on effect and the sensitivity.

Therefore, the step in the related art have problems such as the easy accumulation of dust, the generation of noise after long-term use and the affected step-on effect.

SUMMARY

Embodiments of a first aspect of the present disclosure provide a step mounting mechanism, including: a mounting seat provided with a first shaft hole, a second shaft hole and a first mounting groove, and the first shaft hole and the second shaft hole both passing through the first mounting groove; a drive component mounted to the mounting seat, and connected to a drive shaft in a transmission manner; a first connecting rod including two ends provided with a third shaft hole and a fourth shaft hole respectively, the first shaft hole being hinged with the third shaft hole through the drive shaft, the drive shaft being fixedly connected to the first connecting rod to drive the first connecting rod to swing, the drive shaft being configured to rotate relative to the mounting seat, a first sealing shaft sleeve being fitted over the drive shaft, at least a part of the first sealing shaft sleeve being located in the first shaft hole, and the end of the first connecting rod provided with the third shaft hole being located in the first mounting groove; a second connecting rod including two ends provided with a fifth shaft hole and a sixth shaft hole respectively, the second shaft hole being hinged with the fifth shaft hole through a first hinge shaft, and the end of the second connecting rod provided with the fifth shaft hole being located in the first mounting groove; and a step mounting member provided with a seventh shaft hole and an eighth shaft hole, the fourth shaft hole being hinged with the seventh shaft hole through a second hinge shaft, and the sixth shaft hole being hinged with the eighth shaft hole through a third hinge shaft.

Embodiments of a second aspect of the present disclosure further provide a motorized device, including a step mounting mechanism. The step mounting mechanism includes: a mounting seat provided with a first shaft hole, a second shaft hole and a first mounting groove, and the first shaft hole and the second shaft hole both passing through the first mounting groove; a drive component mounted to the mounting seat, and connected to a drive shaft in a transmission manner; a first connecting rod including two ends provided with a third shaft hole and a fourth shaft hole respectively, the first shaft hole being hinged with the third shaft hole through the drive shaft, the drive shaft being fixedly connected to the first connecting rod to drive the first connecting rod to swing, the drive shaft being configured to rotate relative to the mounting seat, a first sealing shaft sleeve being fitted over the drive shaft, at least a part of the first sealing shaft sleeve being located in the first shaft hole, and the end of the first connecting rod provided with the third shaft hole being located in the first mounting groove; a second connecting rod including two ends provided with a fifth shaft hole and a sixth shaft hole respectively, the second shaft hole being hinged with the fifth shaft hole through a first hinge shaft, and the end of the second connecting rod provided with the fifth shaft hole being located in the first mounting groove; and a step mounting member provided with a seventh shaft hole and an eighth shaft hole, the fourth shaft hole being hinged with the seventh shaft hole through a second hinge shaft, and the sixth shaft hole being hinged with the eighth shaft hole through a third hinge shaft.

Additional aspects and advantages of the present disclosure will be given in part in the following description, become apparent in part from following descriptions, or be learned from the practice of the present disclosure.

DETAILED DESCRIPTION

Figure 1:
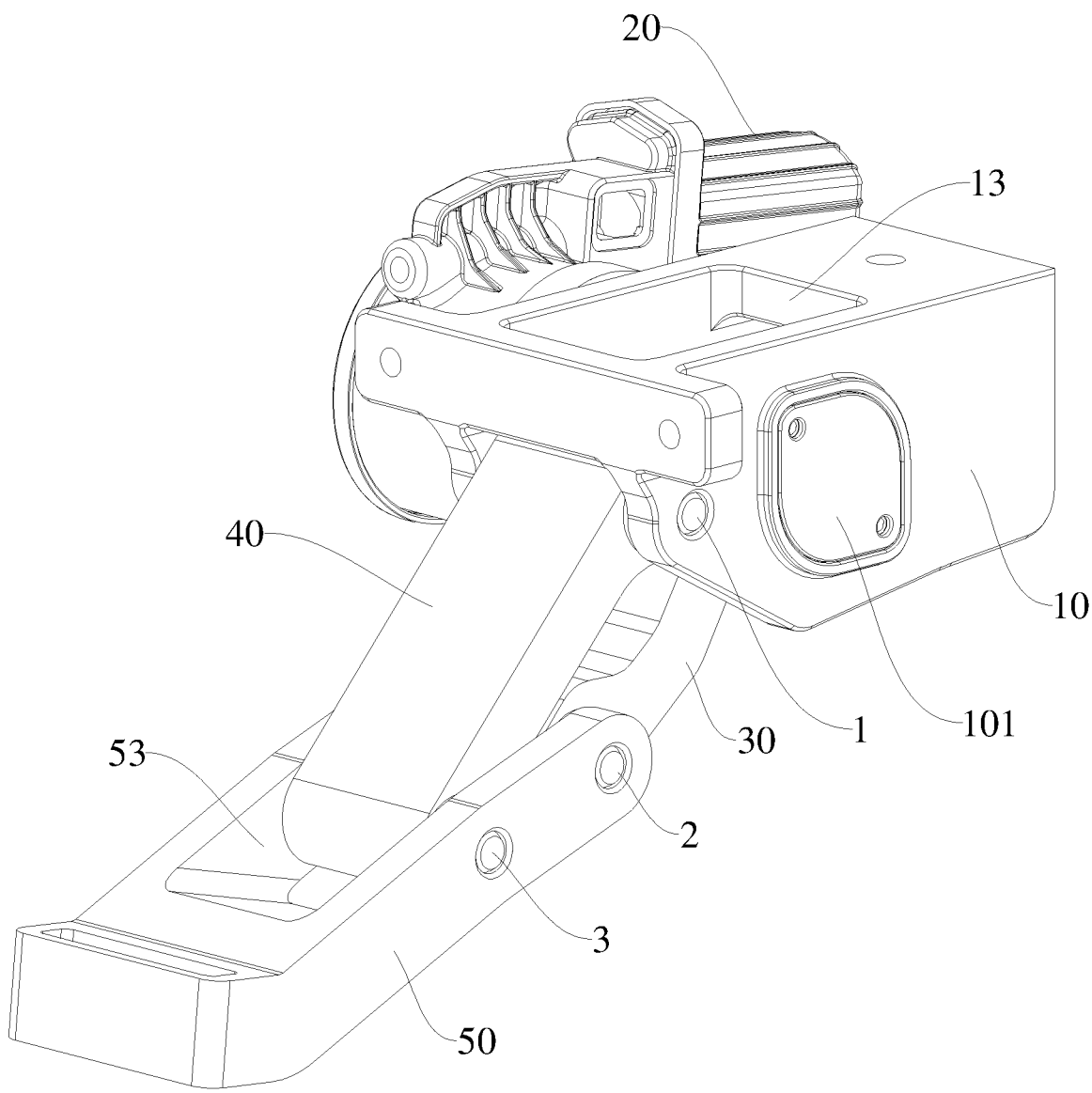
FIG. 1 is a perspective view of a step mounting mechanism according to an embodiment of the present disclosure.
Figure 2:
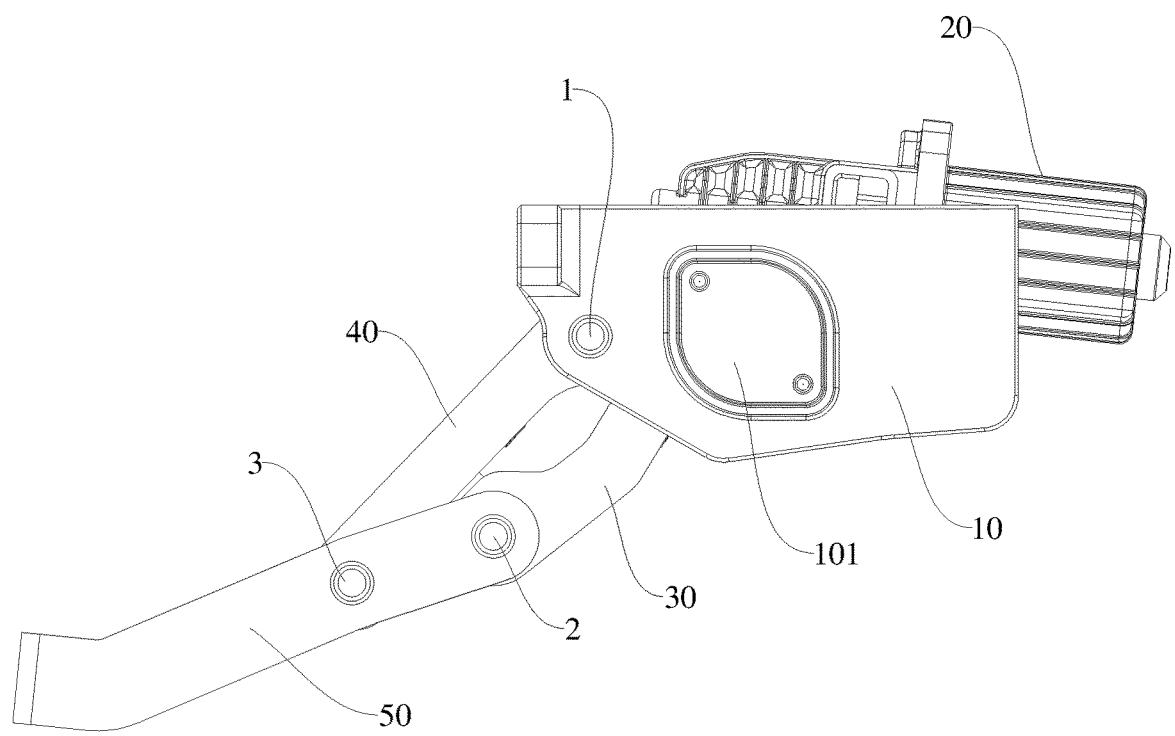
FIG. 2 is a front view of a step mounting mechanism according to an embodiment of the present disclosure.

Embodiments of the present disclosure are described in detail below, and examples of the described embodiments are shown in accompanying drawings. The following embodiments described with reference to the accompanying drawings are exemplary and are intended to explain the present disclosure, rather than limit the present disclosure.

Embodiments of the present disclosure provide a step mounting mechanism configured to mount a step. The step mounting mechanism can be mounted on a vehicle, and the step is mounted on the step mounting mechanism. The step mounting mechanism can drive the step to extend to a designated position for people to step on, and also can drive the step to retract and hide.

Referring to FIGS. 1 to 6, the step mounting mechanism includes a mounting seat 10, a drive component 20, a first connecting rod 30, a second connecting rod 40 and a step mounting member 50. The step mounting member 50 is configured to mount the step.

The mounting seat 10 is provided with a first shaft hole 11 and a second shaft hole 12 axially parallel to each other, and is also provided with a first mounting groove 13, and the first shaft hole 11 and the second shaft hole 12 both pass through the first mounting groove 13.

The drive component 20 is mounted to the mounting seat 10, and is connected to a drive shaft 21 in a transmission manner, that is, power can be transmitted from the drive component 20 to the drive shaft 21. The drive component 20 may be an electric motor or a hydraulic motor, and a driving force of the drive component 20 can drive the drive shaft 21 to rotate.

Two ends of the first connecting rod 30 are provided with a third shaft hole 31 and a fourth shaft hole 32, respectively. The first shaft hole 11 is hinged with the third shaft hole 31 through the drive shaft 21. The drive shaft 21 is fixedly connected to the first connecting rod 30 to drive the first connecting rod 30 to swing. The drive shaft 21 can rotate relative to the mounting seat 10. A first sealing shaft sleeve 211 is fitted over the drive shaft 21, and at least a part of the first sealing shaft sleeve 211 is located in the first shaft hole 11. Therefore, the first sealing shaft sleeve 211 plays a role of sealing the first shaft hole 11, so as to prevent dust and impurities from entering the first shaft hole 11, reduce wear and avoid the generation of noise. The end of the first connecting rod 30 provided with the third shaft hole 31 is located in the first mounting groove 13.

Figure 4:
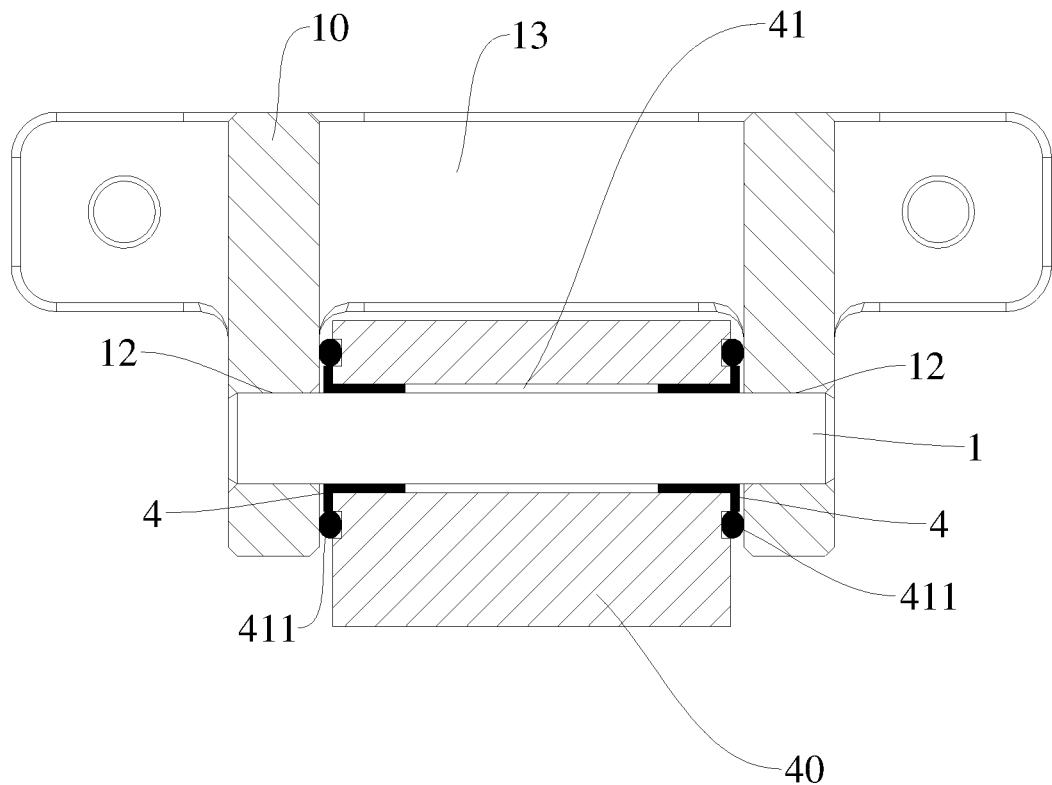
FIG. 4 is a sectional view of a step mounting mechanism along an axis of a first hinge shaft according to an embodiment of the present disclosure.
Figure 6:
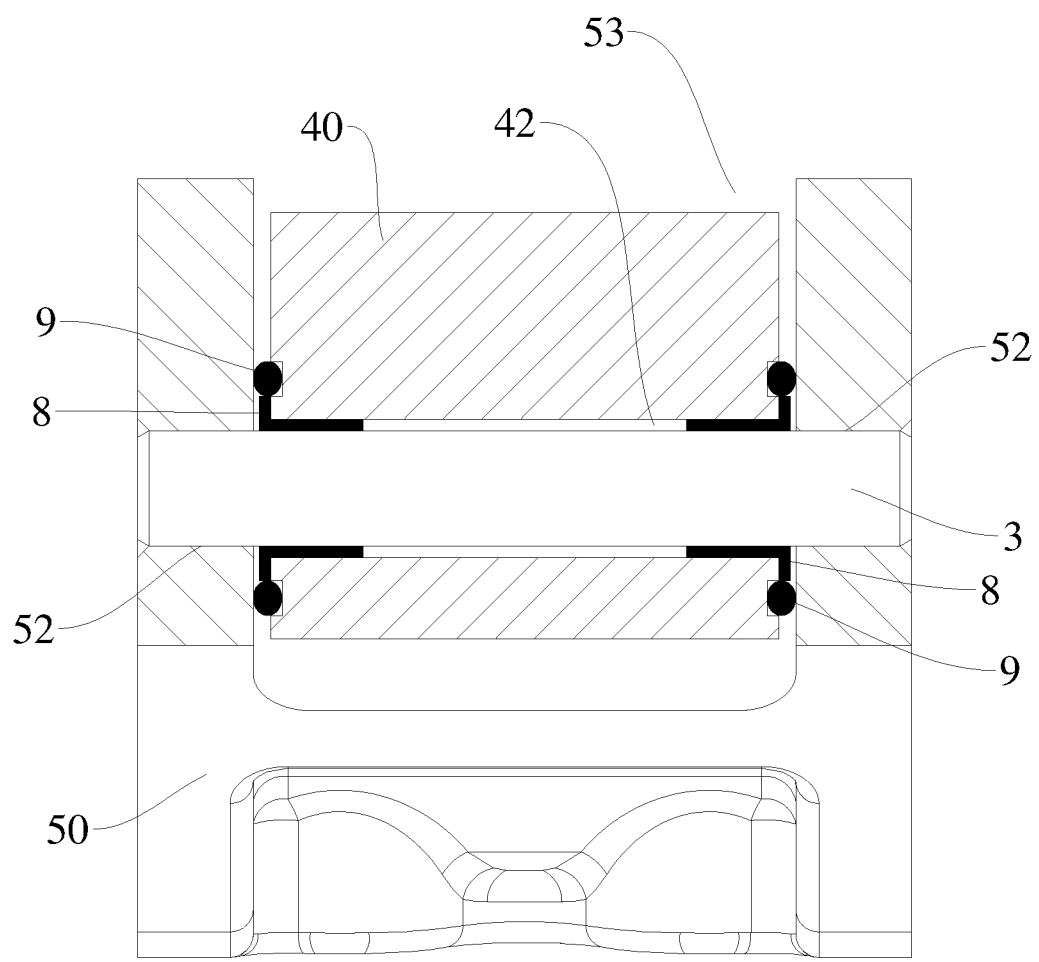
FIG. 6 is a sectional view of a step mounting mechanism along an axis of a third hinge shaft according to an embodiment of the present disclosure.

Referring to FIG. 4 and FIG. 6, two ends of the second connecting rod 40 are provided with a fifth shaft hole 41 and a sixth shaft hole 42, respectively. Referring to FIG. 4, the second shaft hole 12 is hinged with the fifth shaft hole 41 through a first hinge shaft 1, so that the second connecting rod 40 can rotate around the first hinge shaft 1 relative to the mounting seat 10. The first hinge shaft 1 can be in an interference fit with the second shaft hole 12, and can be in a clearance fit with the fifth shaft hole 41. The end of the second connecting rod 40 provided with the fifth shaft hole 41 is located in the first mounting groove 13.

Figure 5:
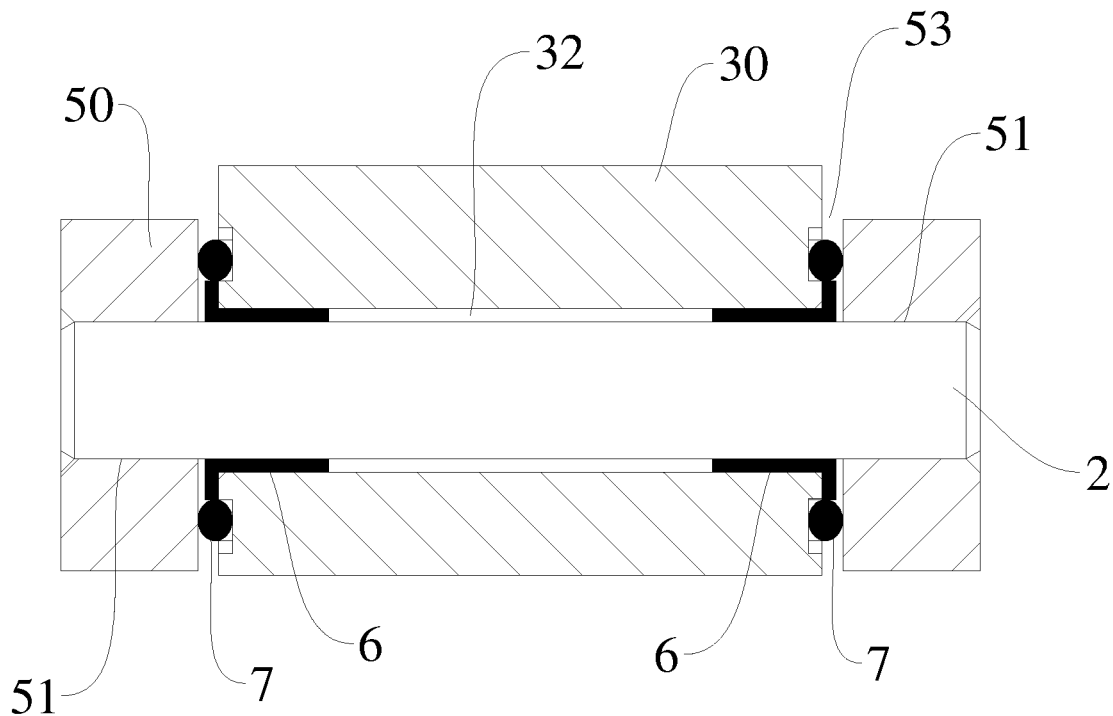
FIG. 5 is a sectional view of a step mounting mechanism along an axis of a second hinge shaft according to an embodiment of the present disclosure.

Referring to FIG. 5 and FIG. 6, the step mounting member 50 is provided with a seventh shaft hole 51 and an eighth shaft hole 52. Referring to FIG. 5, the fourth shaft hole 32 is hinged with the seventh shaft hole 51 through a second hinge shaft 2. The second hinge shaft 2 can be in an interference fit with the seventh shaft hole 51, and can be in a clearance fit with the fourth shaft hole 32.

The step mounting member 50 is provided with a second mounting groove 53, and the seventh shaft hole 51 and the eighth shaft hole 52 both pass through the second mounting groove 53, so that the seventh shaft hole 51 is divided into two parts and the eighth shaft hole 52 is also divided into two parts. The end of the first connecting rod 30 provided with the third shaft hole 31 is located in the first mounting groove 13, and the other end of the first connecting rod 30 provided with the fourth shaft hole 32 is located in the second mounting groove 53. The end of the second connecting rod 40 provided with the fifth shaft hole 41 is located in the first mounting groove 13, and the other end of the second connecting rod 40 provided with the sixth shaft hole 42 is located in the second mounting groove 53.

Referring to FIG. 6, the sixth shaft hole 42 is hinged with the eighth shaft hole 52 through a third hinge shaft 3. The third hinge shaft 3 is in an interference fit with the eighth shaft hole 52, and is in a clearance fit with the sixth shaft hole 42.

The mounting seat 10, the first connecting rod 30, the second connecting rod 40 and the step mounting member 50 are hinged together through the drive shaft 21, the first hinge shaft 1, the second hinge shaft 2 and the third hinge shaft 3, so that the mounting seat 10, the first connecting rod 30, the second connecting rod 40 and the step mounting member 50 constitute a four-link structure. The drive component 20 controls the drive shaft 21 to rotate, so that the first connecting rod 30, the second connecting rod 40 and the step mounting member 50 are driven to be linked, so as to allow the step to extend and retract (hide).

Figure 3:
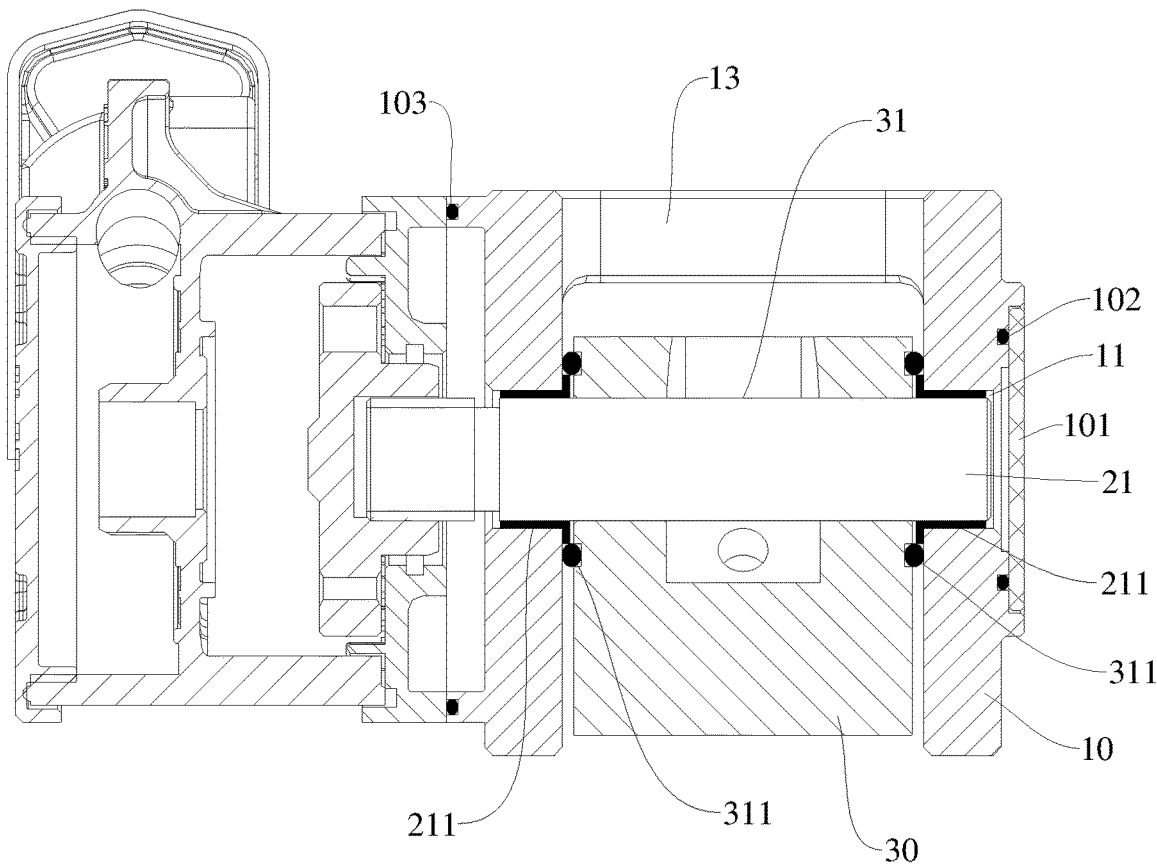
FIG. 3 is a sectional view of a step mounting mechanism along an axis of a drive shaft according to an embodiment of the present disclosure.

In some embodiments, referring to FIG. 3, an outer end surface of the third shaft hole 31 is provided with a first sealing groove, a first sealing ring 311 is arranged in the first sealing groove, and the first sealing ring 311 is squeezed by an outer end surface of the first shaft hole 11. The outer end surface here refers to a surface connected to an outer side of the hole i.e. a surface surrounding an end of the hole. Since the first sealing groove and the first sealing ring 311 are provided, dust or impurities can be prevented from entering the third shaft hole 31 and the first shaft hole 11. The first sealing ring 311 may be an O-ring made of rubber.

As can be seen from FIG. 3, end surfaces on two sides of the third shaft hole 31 are both provided with the first sealing groove and the first sealing ring 311. Since the first shaft hole 11 passes through the first mounting groove 13, it is divided into two parts, and the first sealing shaft sleeve 211 is provided in each part.

In some embodiments, the mounting seat 10 is provided with an end cover 101 covering an end of the drive shaft 21, and a second sealing ring 102 is arranged between the end cover 101 and the mounting seat 10. Since the end cover 101 and the second sealing ring 102 are provided, the end of the drive shaft 21 is not polluted by dust, the wear is reduced and the generation of noise during rotation is avoided.

In some embodiments, a third sealing ring 103 is arranged between the drive component 20 and the mounting seat 10. The third sealing ring 103 seals a joint surface between the drive component 20 and the mounting seat 10, so as to prevent impurities such as dust from falling on the drive shaft 21, thus reducing the wear and avoiding the generation of noise during rotation.

In some embodiments, at least another part of the first sealing shaft sleeve 211 extends onto the outer end surface of the first shaft hole 11, and its extension direction faces towards the first sealing groove. This configuration can further improve the sealing property.

For example, a local cross-section of the first sealing shaft sleeve 211 is L-shaped, and an edge of the first sealing shaft sleeve 211 can be in contact with the first sealing ring 311.

In some embodiments, a second sealing shaft sleeve 4 is fitted over the first hinge shaft 1, and at least a part of the second sealing shaft sleeve 4 is located in the fifth shaft hole 41. Since the second shaft hole 12 passes through the first mounting groove 13, it is divided into two parts, the second sealing shaft sleeve 4 is arranged at each part, and two second sealing shaft sleeves 4 seal the fifth shaft hole 41 at two ends of the fifth shaft hole 41, respectively, so as to prevent impurities such as dust from entering the fifth shaft hole 41 and avoid the generation of noise during rotation.

One second sealing shaft sleeve 4 is fitted over either end of the fifth shaft hole 41, so as to seal the fifth shaft hole 41 at the two ends of the fifth shaft hole 41.

In some embodiments, an outer end surface of the fifth shaft hole 41 is provided with a second sealing groove, a fourth sealing ring 411 is arranged in the second sealing groove, and the fourth sealing ring 411 is squeezed by an outer end surface of the second shaft hole 12. The fourth sealing ring 411 is configured to seal the end surface of the fifth shaft hole 41. The outer end surfaces of the two ends of the fifth shaft hole 41 are both provided with the second sealing groove, and each second sealing groove is provided with the fourth sealing ring 411 therein.

In some embodiments, at least another part of the second sealing shaft sleeve 4 is located on the outer end surface of the fifth shaft hole 41. An edge of the second sealing shaft sleeve 4 can extend to a position where it is in contact with the fourth sealing ring 411.

Figure 7:
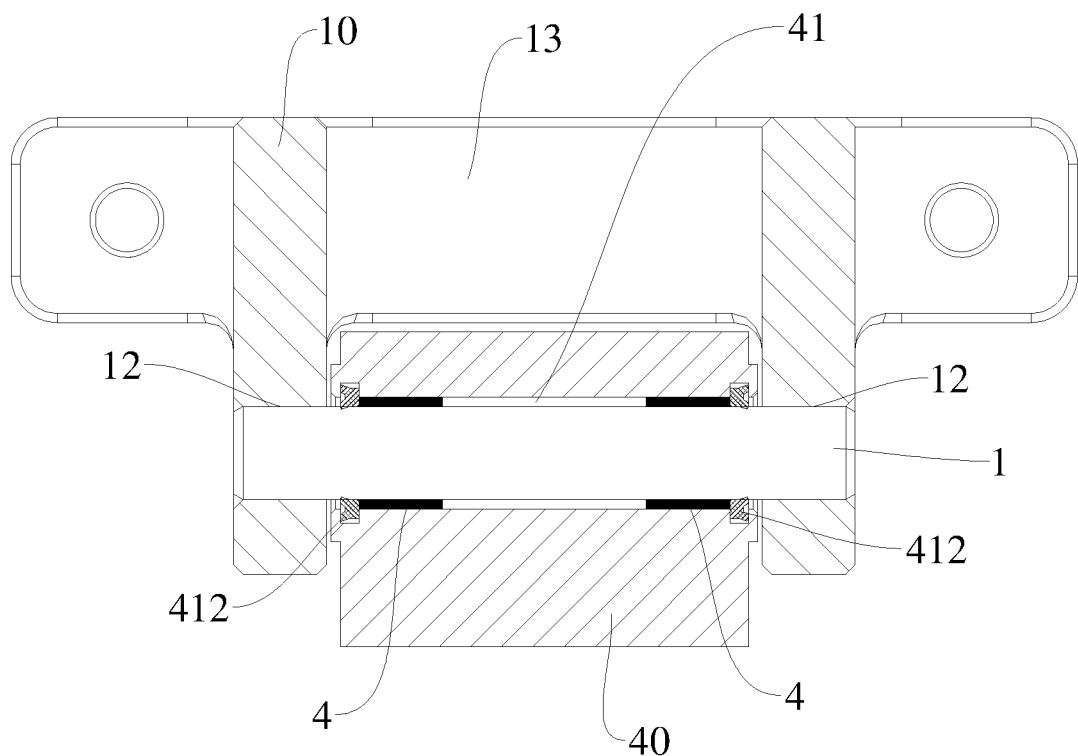
FIG. 7 is a sectional view of a step mounting mechanism along an axis of a first hinge shaft according to another embodiment of the present disclosure.

Referring to FIG. 7, the second sealing shaft sleeve 4 is completely located in the fifth shaft hole 41, the fifth shaft hole 41 is provided with a fifth sealing groove, the fifth sealing groove is located on an outer side of the second sealing shaft sleeve 4, and a seventh sealing ring 412 is arranged in the fifth sealing groove.

A cross-section of the seventh sealing ring 412 is non-circular. For example, the cross-section of the seventh sealing ring 412 may have a Y-shaped structure.

In some embodiments, referring to FIG. 5, a third sealing shaft sleeve 6 is fitted over the second hinge shaft 2, at least a part of the third sealing shaft sleeve 6 is located in the fourth shaft hole 32, and at least another part of the third sealing shaft sleeve 6 extends onto an outer end surface of the fourth shaft hole 32. Two ends of the fourth shaft hole 32 are both provided with the third sealing shaft sleeve 6, so as to seal the fourth shaft hole 32 at the two ends of the fourth shaft hole 32.

Further, the outer end surface of the fourth shaft hole 32 is provided with a third sealing groove, a fifth sealing ring 7 is arranged in the third sealing groove, and the fifth sealing ring 7 is squeezed by an outer end surface of the seventh shaft hole 51. The outer end surfaces of the two ends of the fourth shaft hole 32 are both provided with the third sealing groove, and each third sealing groove is provided with the fifth sealing ring 7 therein.

An arrangement mode of the third sealing shaft sleeve 6 and the fifth sealing ring 7 on the second hinge shaft 2 can be obtained with reference to the embodiment in which the second sealing shaft sleeve 4 and the fourth sealing ring 411 are fitted over the first hinge shaft 1. On this basis, it can be understood by those skilled in the art with reference to the accompanying drawings and thus will not be repeated here.

In some embodiments, referring to FIG. 6, a fourth sealing shaft sleeve 8 is fitted over the third hinge shaft 3, at least a part of the fourth sealing shaft sleeve 8 is located in the sixth shaft hole 42, and at least another part of the fourth sealing shaft sleeve 8 extends onto an outer end surface of the sixth shaft hole 42. Two ends of the sixth shaft hole 42 are both provided with one fourth sealing shaft sleeve 8, so as to seal the sixth shaft hole 42.

In some embodiments, the outer end surface of the sixth shaft hole 42 is provided with a fourth sealing groove, a sixth sealing ring 9 is arranged in the fourth sealing groove, and the sixth sealing ring 9 is squeezed by an outer end surface of the eighth shaft hole 52.

An arrangement mode of the fourth sealing shaft sleeve 8 and the sixth sealing ring 9 on the third hinge shaft 3 can be obtained with reference to the embodiment in which the second sealing shaft sleeve 4 and the fourth sealing ring 411 are fitted over the first hinge shaft 1. On this basis, it can be understood by those skilled in the art with reference to the accompanying drawings and thus will not be repeated here.

Figure 8:
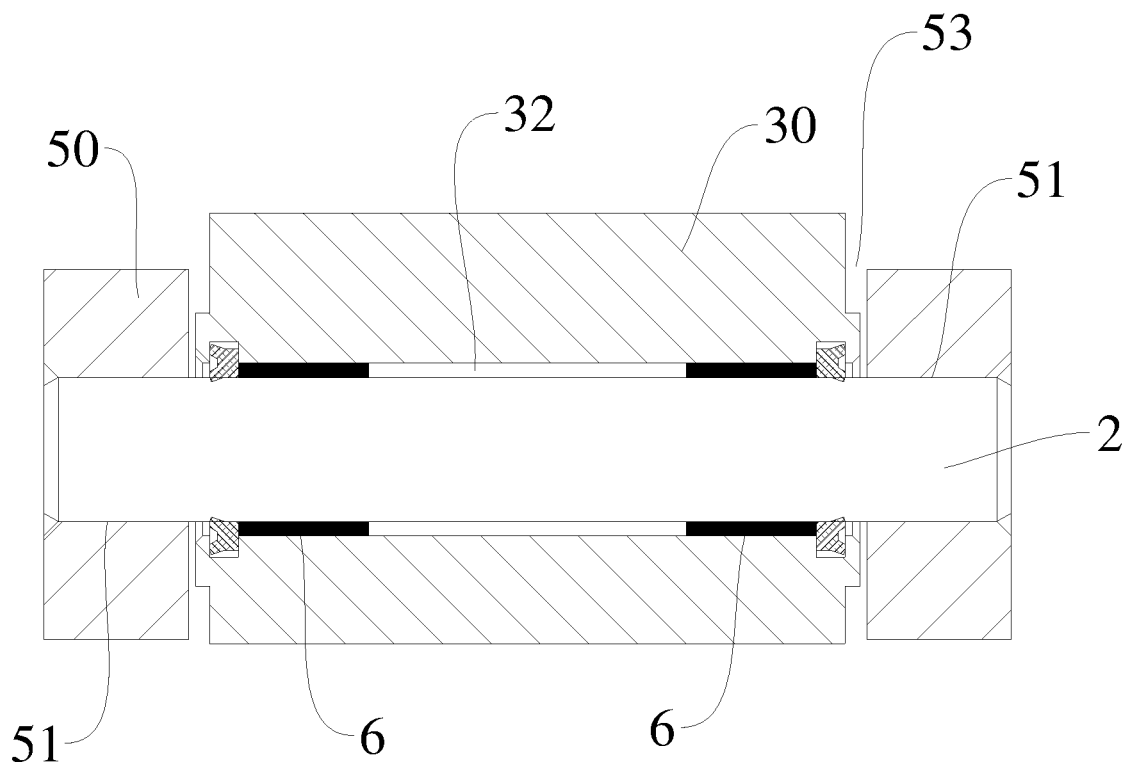
FIG. 8 is a sectional view of a step mounting mechanism along an axis of a second hinge shaft according to another embodiment of the present disclosure.
Figure 9:
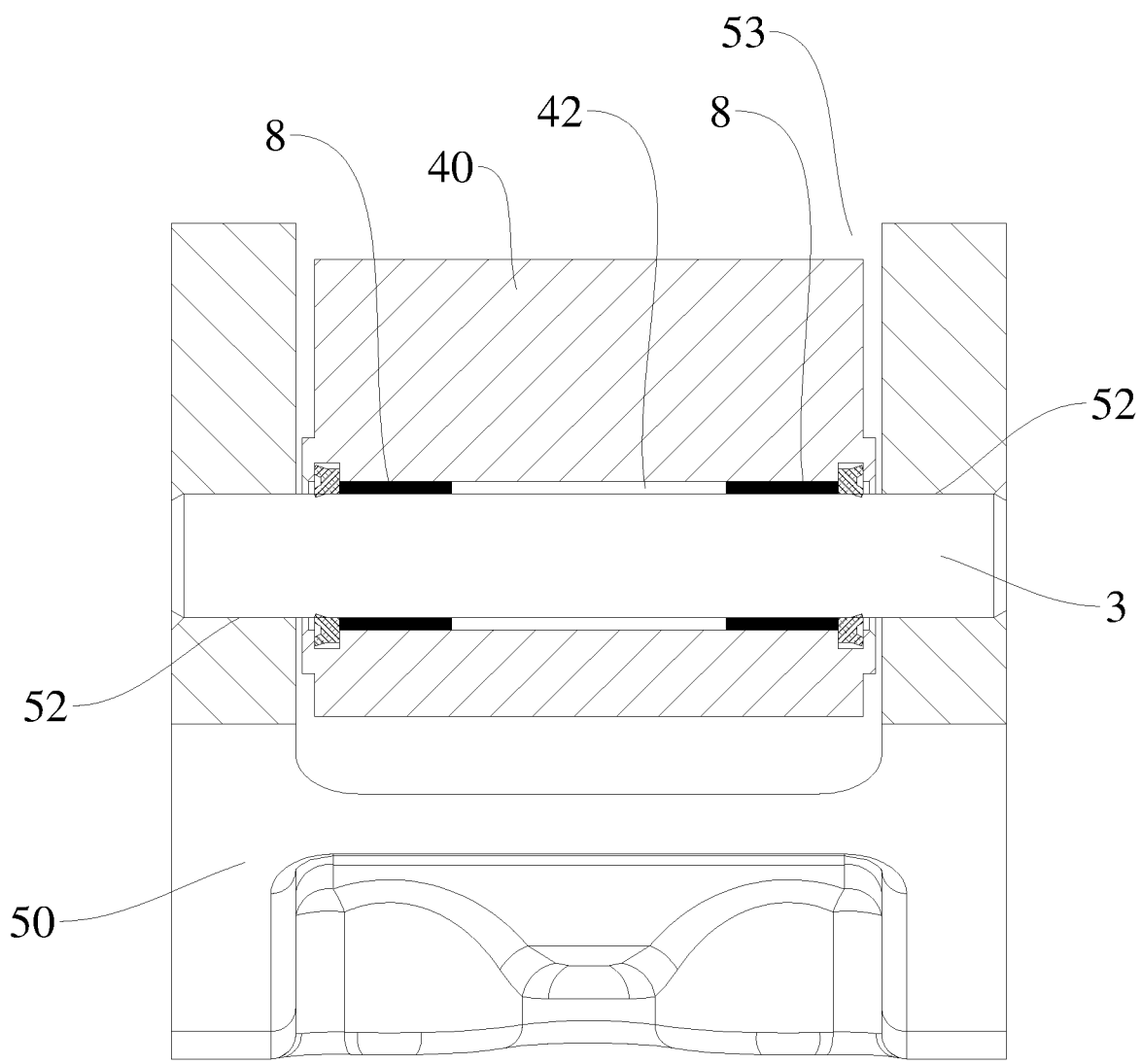
FIG. 9 is a sectional view of a step mounting mechanism along an axis of a third hinge shaft according to another embodiment of the present disclosure.

Referring to FIG. 8, a sealing arrangement of the second hinge shaft 2 and the fourth shaft hole 32 can also be obtained with reference to the sealing arrangement of the first hinge shaft 1 and the fifth shaft hole 41 in FIG. 7. Referring to FIG. 9, a sealing arrangement of the third hinge shaft 3 and the sixth shaft hole 42 can also be obtained with reference to the sealing arrangement of the first hinge shaft 1 and the fifth shaft hole 41 in FIG. 7.

In some embodiments, the first connecting rod 30, the second connecting rod 40 and the step mounting member 50 are all axisymmetric structures.

Embodiments of the present disclosure also provide a motorized device having the step mounting mechanism according to any one of the above embodiments. The step is mounted to the motorized device through the step mounting mechanism. The control is flexible, no noise is generated after long-time use, and the use effect is improved. The motorized device may be a vehicle.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features associated with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "interconnected," "connected," "fixed" and the like are used broadly, and may be, for example, fixed connections, detachable connections, or integral connections; may also be mechanical or electrical connections or intercommunication; may also be direct connections or indirect connections via intervening structures; may also be inner communications or interactions of two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation to the present disclosure, and changes, modifications, alternatives and variations can be made in the above embodiments within the scope of the present disclosure.

What is claimed is:

1. A step mounting mechanism, comprising:
   a mounting seat provided with a first shaft hole, a second shaft hole and a first mounting groove, and the first shaft hole and the second shaft hole both passing through the first mounting groove;
   a drive component mounted to the mounting seat, and connected to a drive shaft in a transmission manner;
   a first connecting rod comprising two ends provided with a third shaft hole and a fourth shaft hole respectively, the first shaft hole being hinged with the third shaft hole through the drive shaft, the drive shaft being fixedly connected to the first connecting rod, the drive shaft being configured to rotate relative to the mounting seat, a first sealing shaft sleeve being fitted over the drive shaft, at least a part of the first sealing shaft sleeve being located in the first shaft hole, and the end of the first connecting rod provided with the third shaft hole being located in the first mounting groove;
   a second connecting rod comprising two ends provided with a fifth shaft hole and a sixth shaft hole respectively, the second shaft hole being hinged with the fifth shaft hole through a first hinge shaft, and the end of the second connecting rod provided with the fifth shaft hole being located in the first mounting groove; and
   a step mounting member provided with a seventh shaft hole and an eighth shaft hole, the fourth shaft hole being hinged with the seventh shaft hole through a second hinge shaft, and the sixth shaft hole being hinged with the eighth shaft hole through a third hinge shaft,
   wherein a second sealing shaft sleeve is fitted over the first hinge shaft, and at least a part of the second sealing shaft sleeve is located in the fifth shaft hole,
   wherein an outer end surface of the fifth shaft hole is provided with a second sealing groove, a fourth sealing ring is arranged in the second sealing groove, and the fourth sealing ring is squeezed by an outer end surface of the second shaft hole,
   wherein an edge of the second sealing shaft sleeve extends to a position where the edge is in contact with the fourth sealing ring.

2. The step mounting mechanism according to claim 1, wherein an outer end surface of the third shaft hole is provided with a first sealing groove, a first sealing ring is arranged in the first sealing groove, and the first sealing ring is squeezed by an outer end surface of the first shaft hole.

3. The step mounting mechanism according to claim 1, wherein the mounting seat is provided with an end cover, the end cover covers an end of the drive shaft, and a second sealing ring is arranged between the end cover and the mounting seat.

4. The step mounting mechanism according to claim 1, wherein a third sealing ring is arranged between the drive component and the mounting seat.

5. The step mounting mechanism according to claim 1, wherein at least another part of the first sealing shaft sleeve extends onto an outer end surface of the first shaft hole.

6. The step mounting mechanism according to claim 1, wherein at least another part of the second sealing shaft sleeve is located on an outer end surface of the fifth shaft hole.

7. The step mounting mechanism according to claim 1, wherein a third sealing shaft sleeve is fitted over the second hinge shaft, at least a part of the third sealing shaft sleeve is located in the fourth shaft hole, and at least another part of the third sealing shaft sleeve extends onto an outer end surface of the fourth shaft hole.

8. The step mounting mechanism according to claim 7, wherein the outer end surface of the fourth shaft hole is provided with a third sealing groove, a fifth sealing ring is arranged in the third sealing groove, and the fifth sealing ring is squeezed by an outer end surface of the seventh shaft hole.

9. The step mounting mechanism according to claim 1, wherein a fourth sealing shaft sleeve is fitted over the third hinge shaft, at least a part of the fourth sealing shaft sleeve is located in the sixth shaft hole, and at least another part of the fourth sealing shaft sleeve extends onto an outer end surface of the sixth shaft hole.

10. The step mounting mechanism according to claim 9, wherein the outer end surface of the sixth shaft hole is provided with a fourth sealing groove, a sixth sealing ring is arranged in the fourth sealing groove, and the sixth sealing ring is squeezed by an outer end surface of the eighth shaft hole.

11. A step mounting mechanism, comprising:
    a mounting seat provided with a first shaft hole, a second shaft hole and a first mounting groove, and the first shaft hole and the second shaft hole both passing through the first mounting groove;
    a drive component mounted to the mounting seat, and connected to a drive shaft in a transmission manner;
    a first connecting rod comprising two ends provided with a third shaft hole and a fourth shaft hole respectively, the first shaft hole being hinged with the third shaft hole through the drive shaft, the drive shaft being fixedly connected to the first connecting rod, the drive shaft being configured to rotate relative to the mounting seat, a first sealing shaft sleeve being fitted over the drive shaft, at least a part of the first sealing shaft sleeve being located in the first shaft hole, and the end of the first connecting rod provided with the third shaft hole being located in the first mounting groove;
    a second connecting rod comprising two ends provided with a fifth shaft hole and a sixth shaft hole respectively, the second shaft hole being hinged with the fifth shaft hole through a first hinge shaft, and the end of the second connecting rod provided with the fifth shaft hole being located in the first mounting groove; and a step mounting member provided with a seventh shaft hole and an eighth shaft hole, the fourth shaft hole being hinged with the seventh shaft hole through a second hinge shaft, and the sixth shaft hole being hinged with the eighth shaft hole through a third hinge shaft, wherein a second sealing shaft sleeve is fitted over the first hinge shaft, and at least a part of the second sealing shaft sleeve is located in the fifth shaft hole, wherein the second sealing shaft sleeve is completely located in the fifth shaft hole, the fifth shaft hole is provided with a fifth sealing groove therein, the fifth sealing groove is located on an outer side of the second sealing shaft sleeve, and a seventh sealing ring is arranged in the fifth sealing groove, wherein a cross-section of the seventh sealing ring has a Y-shaped structure, and a part of an outer side of the seventh sealing ring is enclosed by an outer end surface of the fifth shaft hole.

12. A motorized device, comprising a step mounting mechanism, the step mounting mechanism comprising:

a mounting seat provided with a first shaft hole, a second shaft hole and a first mounting groove, and the first shaft hole and the second shaft hole both passing through the first mounting groove;

a drive component mounted to the mounting seat, and connected to a drive shaft in a transmission manner;

a first connecting rod comprising two ends provided with a third shaft hole and a fourth shaft hole respectively, the first shaft hole being hinged with the third shaft hole through the drive shaft, the drive shaft being fixedly connected to the first connecting rod, the drive shaft being configured to rotate relative to the mounting seat, a first sealing shaft sleeve being fitted over the drive shaft, at least a part of the first sealing shaft sleeve being located in the first shaft hole, and the end of the first connecting rod provided with the third shaft hole being located in the first mounting groove;

a second connecting rod comprising two ends provided with a fifth shaft hole and a sixth shaft hole respectively, the second shaft hole being hinged with the fifth shaft hole through a first hinge shaft, and the end of the second connecting rod provided with the fifth shaft hole being located in the first mounting groove; and a step mounting member provided with a seventh shaft hole and an eighth shaft hole, the fourth shaft hole being hinged with the seventh shaft hole through a second hinge shaft, and the sixth shaft hole being hinged with the eighth shaft hole through a third hinge shaft, wherein a second sealing shaft sleeve is fitted over the first hinge shaft, and at least a part of the second sealing shaft sleeve is located in the fifth shaft hole, wherein an outer end surface of the fifth shaft hole is provided with a second sealing groove, a fourth sealing ring is arranged in the second sealing groove, and the fourth sealing ring is squeezed by an outer end surface of the second shaft hole, wherein an edge of the second sealing shaft sleeve extends to a position where the edge is in contact with the fourth sealing ring.

\* \* \* \* \*